(12) United States Patent
Kwak et al.

(10) Patent No.: US 10,728,908 B2
(45) Date of Patent: Jul. 28, 2020

(54) BASE STATION OPERATION METHOD AND DEVICE FOR SUPPORTING D2D SIGNAL TRANSMISSION IN WIRELESS COMMUNICATION SYSTEM

(71) Applicant: Samsung Electronics Co., Ltd, Suwon-si (KR)

(72) Inventors: Yongjun Kwak, Yongin-si (KR); Taehan Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 61 days.

(21) Appl. No.: 16/065,685

(22) PCT Filed: Dec. 20, 2016

(86) PCT No.: PCT/KR2016/014920
§ 371 (c)(1),
(2) Date: Jun. 22, 2018

(87) PCT Pub. No.: WO2017/111421
PCT Pub. Date: Jun. 29, 2017

(65) Prior Publication Data
US 2019/0007951 A1     Jan. 3, 2019

(30) Foreign Application Priority Data

Dec. 22, 2015   (KR) .................. 10-2015-0184158

(51) Int. Cl.
*H04L 5/00* (2006.01)
*H04W 72/08* (2009.01)
(Continued)

(52) U.S. Cl.
CPC ........ *H04W 72/085* (2013.01); *H04B 17/327* (2015.01); *H04L 1/001* (2013.01);
(Continued)

(58) Field of Classification Search
CPC ........... H04W 72/085; H04W 72/0406; H04W 8/005; H04W 4/70; H04L 5/0055;
(Continued)

(56) References Cited

U.S. PATENT DOCUMENTS

2014/0086152 A1   3/2014  Bontu et al.
2014/0269338 A1   9/2014  Jung et al.
(Continued)

FOREIGN PATENT DOCUMENTS

CN      104601300 A     5/2015
WO      2014/137170 A1  9/2014

OTHER PUBLICATIONS

International Search Report dated Mar. 9, 2017 in connection with International Patent Application No. PCT/KR2016/014920.
(Continued)

*Primary Examiner* — Thai Nguyen

(57) ABSTRACT

The present disclosure relates to a communication technique for converging, with an IoT technology, a 5G communication system for supporting a higher data transmission rate than a 4G system, and a system therefor. The present disclosure may be applied to intelligent services, such as smart homes, smart buildings, smart cities, smart cars or connected cars, health care, digital education, retail businesses, and security and safety related services, on the basis of 5G communications technologies and IoT-related technologies. The purpose of the present invention is to solve the problem of discharged electrical power in a band caused by a D2D signal transmission adding noise to cellular signal transmission. The present invention may comprise: transmitting downlink data to a terminal from a base station; receiving positive reception acknowledgement (ACK) or negative reception acknowledgement (NACK) information on a physical uplink control channel (PUCCH) according to the results of receiving the downlink data; determining
(Continued)

whether an uplink resource where the ACK or NACK information is received is included in a first resource or a second resource; and interpreting, in particular by the base station, the ACK or NACK information as ACK if the uplink resource where the ACK or NACK information is received is included in the first resource.

14 Claims, 8 Drawing Sheets

(51) Int. Cl.

| | | |
|---|---|---|
| H04L 1/00 | (2006.01) | |
| H04L 1/18 | (2006.01) | |
| H04L 1/20 | (2006.01) | |
| H04L 1/16 | (2006.01) | |
| H04B 17/327 | (2015.01) | |
| H04W 4/70 | (2018.01) | |
| H04W 8/00 | (2009.01) | |
| H04W 72/04 | (2009.01) | |

(52) U.S. Cl.
CPC .......... *H04L 1/0003* (2013.01); *H04L 1/0004* (2013.01); *H04L 1/1607* (2013.01); *H04L 1/1887* (2013.01); *H04L 1/20* (2013.01); *H04L 5/00* (2013.01); *H04L 5/0048* (2013.01); *H04L 5/0055* (2013.01); *H04W 4/70* (2018.02); *H04W 8/005* (2013.01); *H04W 72/0406* (2013.01)

(58) Field of Classification Search
CPC ....... H04L 5/0048; H04L 1/0003; H04L 1/20; H04L 1/1887; H04L 1/1607; H04L 1/001; H04L 1/0004; H04L 5/00; H04B 17/327
See application file for complete search history.

(56) References Cited

U.S. PATENT DOCUMENTS

| | | |
|---|---|---|
| 2015/0098422 A1 | 4/2015 | Sartori et al. |
| 2015/0156693 A1 | 6/2015 | Tabet et al. |
| 2015/0173048 A1 | 6/2015 | Seo et al. |
| 2015/0173098 A1 | 6/2015 | Agiwal et al. |
| 2015/0181587 A1 | 6/2015 | Yang et al. |
| 2015/0208453 A1 | 7/2015 | Yamazaki et al. |
| 2016/0007383 A1 | 1/2016 | Chae et al. |
| 2017/0223695 A1* | 8/2017 | Kwak ............... H04W 56/0075 |
| 2017/0325277 A1* | 11/2017 | Fujishiro ................. H04W 4/06 |
| 2019/0098605 A1* | 3/2019 | Seo ........................ H04L 5/0055 |

OTHER PUBLICATIONS

Written Opinion of the International Searching Authority dated Mar. 9, 2017 in connection with International Patent Application No. PCT/KR2016/014920.
Alcatel-Lucent Shanghai Bell et al., "Evaluation of Impact of D2D to WAN system performance", 3GPP TSG RAN WG1 Meeting #78bis, Oct. 6-10, 2014, 11 pages, R1-144073.
Qualcomm Incorporated, "Simulation results for D2D and WAN coexistence", 3GPP TSG-RAN WG1 #79, Nov. 17-21, 2014, 15 pages, R1-145068.
Samsung, "Utilization of multiple resource pools based on RSRP for type-1 discovery", 3GPP TSG RAN WG1 Meeting #78bis, 5 pages, R1-143867.
Supplementary Partial European Search Report dated Nov. 12, 2018 in connection with European Patent Application No. 16 87 9288, 12 pages.
Supplementary European Search Report dated Mar. 19, 2019 in connection with European Patent Application No. 16 87 9288, 13 pages.
Samsung, "Physical channel design for D2D communication", 3GPP TSG RAN WG1 Meeting #76, Feb. 10-14, 2014, 4 pages.

* cited by examiner

BASE STATION OPERATION METHOD AND DEVICE FOR SUPPORTING D2D SIGNAL TRANSMISSION IN WIRELESS COMMUNICATION SYSTEM

CROSS-REFERENCE TO RELATED APPLICATIONS AND CLAIM OF PRIORITY

This application is a 371 of International Application No. PCT/KR2016/014920 filed Dec. 20, 2016, which claims priority to Korean Patent Application No. KR 10-2015-0184158 filed on Dec. 22, 2015, the disclosures of which are herein incorporated by reference in their entirety.

BACKGROUND

1. Field

The present invention relates to a wireless communication system and, in particular, to a device-to-device (D2D) operation impact minimization method and apparatus of a base station in a system supporting a D2D communication technology and a cellular communication technology.

2. Description of Related Art

In order to meet the increasing demand for wireless data traffic since the commercialization of $4^{th}$ generation (4G) communication systems, the development focus is on the $5^{th}$ generation (5G) or pre-5G communication system. For this reason, the 5G or pre-5G communication system is called a beyond 4G network communication system or post long-term evolution (LTE) system. Implementation of the 5G communication system in millimeter wave (mmWave) frequency bands (e.g., 60 GHz bands) is being considered to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna. Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation. Furthermore, the ongoing research includes the use of hybrid frequency shift keying (FSK) and quadrature amplitude modulation (QAM) {FQAM} and sliding window superposition coding (SWSC) as advanced coding modulation (ACM), filter bank multi-carrier (FBMC), non-orthogonal multiple access (NOMA), and sparse code multiple access (SCMA).

Meanwhile, the Internet is evolving from a human-centric communication network in which information is generated and consumed by humans to the Internet of things (IoT) in which distributed things or components exchange and process information. The combination of the cloud server-based Big data processing technology and the IoT begets Internet of everything (IoE) technology. In order to secure the sensing technology, wired/wireless communication and network infrastructure, service interface technology, and security technology required for implementing the IoT, recent research has focused on sensor network, machine-to-machine (M2M), and machine-type communication (MTC) technologies. In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy information technology (IT) and convergence of various industries.

Thus, there are various attempts to apply the IoT to the 5G communication system. For example, the sensor network, M2M, and MTC technologies are implemented by means of the 5G communication technologies such as beamforming, MIMO, and array antenna. The application of the aforementioned cloud RAN as a big data processing technology is an example of convergence between the 5G and IoT technologies.

In a situation where the D2D and cellular communication technologies are integrated in the system, an in-band emission power of a D2D signal transmitted by a D2D terminal may act as noise in cellular signal transmission; thus, there is a need of a method for overcoming this problem.

SUMMARY

The present invention has been conceived to solve the above problem and aims to provide operation methods and apparatuses of a terminal and a base station that are capable of facilitating both D2D and cellular communications without system throughput degradation caused by in-band emission power between D2D terminals and between D2D and cellular terminals in a mobile communication system.

In accordance with an aspect of the present invention, a method for a wireless communication system includes transmitting downlink data from a base station to a terminal, receiving acknowledgement (ACK) or negative acknowledgement (NACK) information corresponding to the downlink data from the terminal on a physical uplink control channel (PUCCH), and determining whether an uplink resource on which the ACK or NACK information is received is included in a first resource or a second resource, wherein if the uplink resource on which the ACK or NACK information is received is included in the first resource, the ACK or NACK information is determined by the base station as ACK.

In accordance with another aspect of the present invention, a method for a wireless communication system includes determining, if downlink data is transmitted to a terminal in a first subframe, whether a physical uplink control channel (PUCCH) resource on which acknowledgement (ACK) or negative acknowledgement (NACK) information corresponding to the downlink data is received is included in a first resource or a second resource; and transmitting from the base station to the terminal, the downlink data in a second subframe following the first subframe, if the PUCCH resource is included in the first resource, and the downlink data in the first subframe, if the PUCCH resource is included in the second resource.

In accordance with an aspect of the present invention, a method for a wireless communication system includes determining, if downlink data is transmitted from a base station to a terminal in a first subframe, whether a physical uplink control channel (PUCCH) resource on which acknowledgement (ACK) or negative acknowledgement (NACK) information corresponding to the downlink data is received is included in a first resource or a second resource; and adjusting, if the PUSCH resource is included in the first resource, modulation and coding scheme (MCS) level information included in downlink control information, which is transmitted to the terminal for reducing an error rate of the downlink data.

In accordance with another aspect of the present invention, a base station for a wireless communication system includes a transceiver configured to transmit and receive signals to and from a terminal and a controller configured to control the transceiver to transmit downlink data to a terminal, receive acknowledgement (ACK) or negative acknowledgement information (NACK) corresponding to the downlink data from the terminal on a physical uplink control channel (PUCCH), and determine whether an uplink resource on which the ACK or NACK information is received is included in a first resource or a second resource, wherein the controller determines, if the uplink resource on which the ACK or NACK information is received is included in the first resource, the ACK or NACK information as ACK.

In accordance with another aspect of the present invention, a base station for a wireless communication system includes a transceiver configured to transmit and receive signals to and from a terminal and a controller configured to determine, if downlink data is transmitted to a terminal in a first subframe, whether a physical uplink control channel (PUCCH) resource on which acknowledgement (ACK) or negative acknowledgement (NACK) information corresponding to the downlink data is received is included in a first resource or a second resource and control the transceiver to transmit, to the terminal, the downlink data in a second subframe following the first subframe, if the PUCCH resource is included in the first resource, and the downlink data in the first subframe, if the PUCCH resource is included in the second resource.

In accordance with another aspect of the present invention, a base station for a wireless communication system includes a transceiver configured to transmit and receive signals to and from a terminal and a controller configured to determine, if downlink data is transmitted to a terminal in a first subframe, whether a physical uplink control channel (PUCCH) resource on which an acknowledgement (ACK) or negative acknowledgement (NACK) information corresponding to the downlink data is received is included in a first resource or a second resource and adjust, if the PUSCH resource is included the first resource, modulation and coding scheme (MCS) level information included in downlink control information, which is transmitted to the terminal for reducing an error rate of the downlink data.

Preferably, the first resource is a cellular communication resource multiplexed with a device-to-device (D2D) communication resource in use by terminals measuring a reference signal received power (RSRP) value of the base station that is greater than a predetermined threshold value, and the second resource is a cellular communication resource multiplexed with a D2D communication resource in use by terminals measuring the RSRP value of the base station that is less than the threshold value.

The present invention is advantageous in terms of reducing interference between terminal-specific signal transmissions and improving communication performance in a mobile communication system. Also, the present invention is advantageous in terms of minimizing performance degradation caused by D2D signals in downlink and uplink transmissions of a terminal by defining a D2D communication-related base station operation in a mobile communication system.

DETAILED DESCRIPTION

Figure 1:
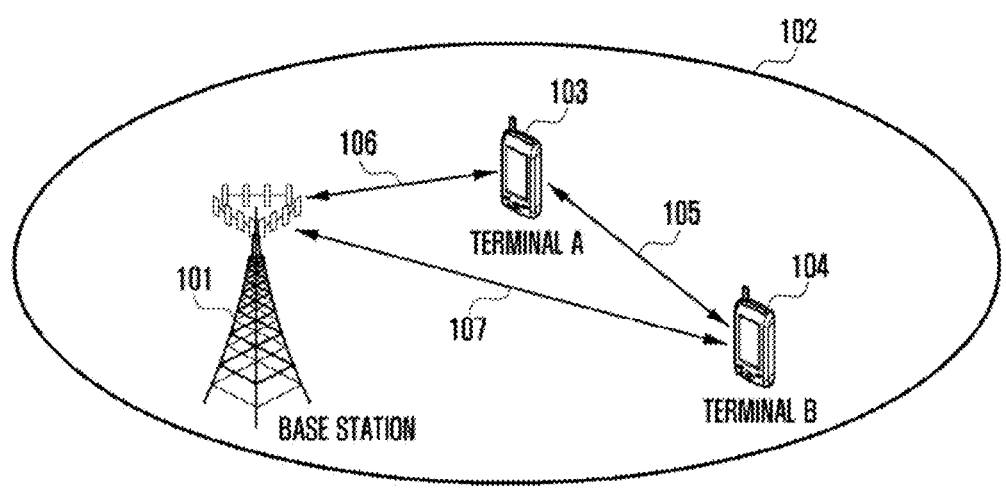
FIG. 1 is a diagram illustrating a wireless mobile communication system supporting D2D communication according to an embodiment of the present invention.

Exemplary embodiments of the present invention are described in detail with reference to the accompanying drawings.

Detailed descriptions of well-known functions and structures incorporated herein may be omitted to avoid obscuring the subject matter of the present invention. This aims to omit unnecessary description so as to make the subject matter of the present invention clear.

For the same reason, some elements are exaggerated, omitted, or simplified in the drawings and, in practice, the elements may have sizes and/or shapes different from those shown in the drawings. The same reference numbers are used throughout the drawings to refer to the same or like parts.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time or may be performed in reverse order according to their functions.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

With the diversification of wireless mobile communication services, there is a growing demand for new technologies capable of supporting the newly emerging services more efficiently; thus, research and development are being conducted on new methods and technologies to meet the demand in a wireless mobile communication system.

D2D communication is a new technology that emerged as a solution for facilitating new communication services by enabling neighboring devices to communicate directly with each other. In the D2D communication mode, a terminal may perform a discovery operation for finding neighboring terminals and a direct communication operation, if necessary, for communication with one of the found terminals.

D2D direct communication is advantageous in terms of radio resource utilization efficiency because it requires a relatively small amount of resources in comparison with the base station-involved communication in the legacy radio cellular network. Also, the D2D discovery operation that enables a terminal to find neighboring terminals makes it possible for the terminal to transmit necessary information to target terminals and thus facilitate implementation of advertisement services and social network services (SNS). It is also necessary for the D2D technology to be supported in LTE-Advanced (LTE-A), and it was discussed as part of the LTE-A.

In the case where a D2D terminal transmits certain information to terminals scattered within a large area, if the D2D terminal (terminal supporting both D2D and cellular communications) transmits data at an arbitrary transmit power level, the in-band emission power causes a non-negligible noise effect at terminals other than the D2D terminal that wants to receive the data. Particularly in the system supporting both D2D and cellular communication technologies, the in-band emission power of the D2D signal transmitted by a D2D terminal may act as noise in a cellular signal transmission; thus, there is a need of a method for solving this problem.

The present invention has been conceived to solve the above problem and aims to provide an operation methods and apparatuses of a terminal and a base station that are capable of facilitating both D2D and cellular communications without system throughput degradation caused by in-band emission power between D2D terminals and between D2D and cellular terminals in a mobile communication system. The present invention is advantageous in terms of minimizing the noise effect of the in-band emission of the terminal transmitting a discovery signal and improving terminal discovery performance; and it includes a scheduling, resource allocation, and uplink power control configuration method.

Although the description is directed to an OFDM-based radio communication system, particularly the $3^{rd}$ evolved universal terrestrial radio access (3GPP EUTRA), it will be understood by those skilled in the art that the present invention can be applied even to other communication systems having a similar technical background and channel format, with a slight modification, without departing from the spirit and scope of the present invention.

In the following descriptions, the terms "base station" and "cell" may be interchangeably used with the same meaning. The term "D2D communication" may be used to intend to include both the D2D discovery operation for finding neighboring terminals and the D2D direct communication operation for exchanging information directly between terminals.

FIG. 1 is a diagram illustrating a wireless mobile communication system supporting D2D communication according to an embodiment of the present invention.

In reference to FIG. 1, a base station 101 (evolved Node B (eNB)) schedules terminal A 103 (user equipment (UE) or mobile station (MS)) and terminal B 104 located within a cell 102 hosted by the base station 101. The expression that the base station 101 schedules the terminal A 103 and the terminal B 104 may include the meaning that the base station provides the terminal with a radio access service. The terminal A 103 may perform cellular communication with the base station 101 through a terminal-base station link 106. Also, the UE B 104 may perform cellular communication with the base station 101 through another terminal-base station link 107. In this embodiment, the cellular communication may include communication of signals between a base station and a terminal. If the terminal A 103 and the terminal B 104 are D2D-enabled terminals, they may perform the discovery operation or direct communication operation through a D2D link 105 without assistance of the base station 101.

Basically, the D2D communication technology being adopted in a cellular mobile communication system such as an LTE-A system should be designed so that it does not have a negative impact on the legacy cellular communication terminals.

An embodiment of the present invention is directed to a technique of allocating separate radio resources to cellular terminals (in the present invention, the term "cellular terminal" is used to mean a terminal supporting only the legacy base station-assisted communication and not the D2D communication) and D2D terminals as a method for avoiding mutual interference between D2D and cellular terminals. However, it may also be possible to consider a method of allowing cellular and D2D terminals to share the same resources without interfering with each other.

An LTE or LTE-A system may adopt frequency division duplexing (FDD) as its duplexing mode in which uplink (UL) and downlink (DL) are separated in frequency. In the FDD mode, the DL and UL transmissions are separated in the frequency domain. In the case of implementing D2D communication into a cellular system operating in the FDD mode, it is preferable to use the UL resources for D2D communication. This is because it is more difficult, in an FDD system, to allocate the downlink resources into which more types of signals are multiplexed than the uplink resources for the purpose of D2D communication. Furthermore, by the nature of communication services provided in the FDD system designed in consideration of the existence of only the legacy cellular terminals, downlink traffic is much more dominant than uplink traffic, which means that DL overhead is dominant in comparison with UL overhead and thus makes it more burdensome to use the DL frequency resource than the UL. Accordingly, if the DL resources are allocated for D2D communication, the overburden on the DL resources may make it difficult to achieve a DL-UL frequency resource utilization balance. For the above reasons, it is preferable to use the UL resources for D2D communication in the communication operating in the FDD mode. Although the above description is directed to the advantages of using the DL frequency resources for D2D communication, it should be noted that the description is not intended to conclude that DL frequency resources cannot be used for D2D communication.

The next question is how to distinguish between legacy cellular communication and D2D communication resources. The legacy cellular communication resources and D2D communication resources may be allocated in an orthogonal multiplexing scheme such as time division multiplexing (TDM) and frequency division multiplexing (FDM) or in a non-orthogonal multiplexing scheme reusing the same resources.

As described above, the D2D communication should be designed so that it does not have a negative impact on the legacy cellular communication terminals and, in this respect, the orthogonal multiplexing scheme is preferable.

Figure 2:
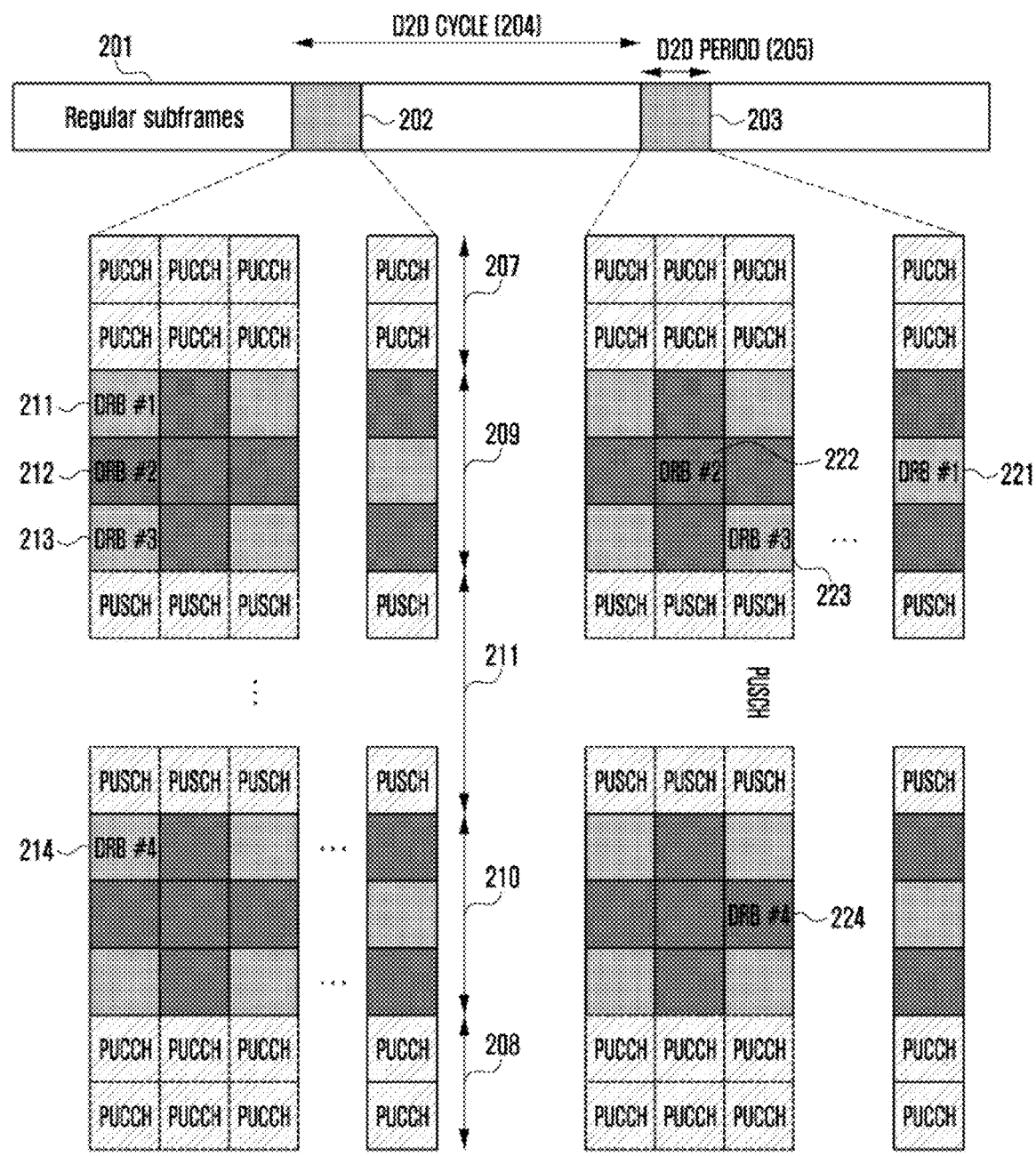
FIG. 2 is a diagram illustrating a principle of multiplexing D2D signal transmission resources and cellular signal transmission resources according to an embodiment of the present invention.

FIG. 2 is a diagram illustrating a principle of multiplexing D2D signal transmission resources and cellular signal transmission resources according to an embodiment of the present invention.

In reference to FIG. 2, reference number 201 denotes regular subframes, and reference numbers 202 and 203 denote D2D subframes. A D2D signal may be transmitted in preconfigured subframes but may not be transmitted in all subframes. As shown in FIG. 2, it may also be possible to configure even the subframes allocated for D2D signal transmission to convey physical uplink control channels (PUCCH) and physical uplink shared channels (PUSCH) for cellular communication. That is, the D2D signal transmission resources and legacy cellular signal transmission resources are multiplexed into a subframe configured for D2D transmission in the frequency domain.

The period 201 may be configured for use in cellular communication, and the periods 202 and 203 may be configured for use in D2D communication.

The periods 202 and 203 may be referred to as D2D periods as denoted by reference number 205, and a D2D period occurrence interval may be referred to as a D2D cycle as denoted by reference number 204. Although the D2D period is depicted as a set of consecutive subframes in FIG. 2, the consecutiveness of the subframes is not mandatory; thus, it may also be configured with the D2D period as a set of non-consecutive subframes.

The D2D signals are multiplexed into the at least one of the periods 202 and 203 with the length of the D2D period 205, and the D2D periods may include PUCCHs 207 and 208 carrying an HARQ acknowledgement (acknowledgement/negative acknowledgement (ACK/NACK) corresponding to DL cellular communication data) or channel quality indicator (CQI) as DL channel condition information and PUSCH 211 carrying UL cellular data. According to an embodiment of the present invention, the PUCCHs may be arranged at both edges of the frequency band in the D2D period as denoted by reference numbers 207 and 208, and the PUSCH 211 may be arranged at the center of the frequency band.

Along with the PUCCH and PUSCH, the D2D signals may be multiplexed into the D2D period 205 on the D2D resources 209 and 210, i.e., D2D resource blocks (DRBs) as a time-frequency region. In FIG. 2, the D2D resources are multiplexed into two regions 209 and 210 of one subframe to allocate PUSCH resources at the center of the frequency band as denoted by reference number 211; and, if no PUSCH resource exists, it may be possible to multiplex the D2D resources into one region. According to an embodiment of the present invention, one DRB may be defined as an arbitrary size of a time-frequency resource unit, and it may be possible to multiplex a plurality of DRBs into a D2D period in a shape of a grid. For example, one DRB may be defined as being composed of one subframe and 24 subcarriers (i.e., two RBs) that is identical with two physical resource blocks (PRBs). An arbitrary terminal may transmit its D2D signals in one of the multiplexed DRBs.

In order to support the D2D discovery operation, the terminal may transmit a discovery signal once every D2D period. It may also be possible to transmit the discovery signal multiple times, but in the present invention it is assumed that the terminal transmits the D2D discovery signal once during one D2D period to facilitate the technique. Then, the discovery signal is transmitted again during the next D2D period. Here, the discovery signal transmission resource position may be selected by the terminal arbitrarily, randomly, or according to an arbitrary rule.

According to an embodiment of the present invention, it may be possible for a plurality of terminals to transmit their discovery signal in one DRB. As described above, the terminal may determine a DRB for use in transmitting the discovery signal according to an arbitrary or predetermined rule and transmit the discovery signal on the determined DRB. For example, terminal 1 may transmit its discovery signal on the DRB 211, terminal 2 may transmit its discovery signal on the DRB 212, terminal 3 may transmit its discovery signal on the DRB 213, and terminal 4 may transmit its discovery signal on the DRB 214. According to an embodiment of the present invention, the terminals may be mapped to DRBs in a relative manner.

According to an embodiment of the present invention, if the terminals 1 to 4 transmit their discovery signals in the same time period (same subframe), none of the terminals can receive the discovery signals transmitted by others. That is, terminal 1 cannot receive the discovery signals transmitted by terminals 2 to 4; terminal 2 cannot receive the discovery signals transmitted by terminals 1, 3, and 4; terminal 3 cannot receive the discovery signals transmitted by terminals 1, 2, and 4; and terminal 4 cannot receive the discovery signals transmitted by terminals 1 to 3. In order to solve this problem that the terminals transmitting discovery signals in the same time period cannot receive the discovery signals of each of the other terminals, use of a time-frequency hopping scheme in which the DRB position changes every discovery period may be considered. If the positions of the DRBs 1 to 4 for the terminals to transmit their discovery signals change in the current discovery period in comparison with the previous discovery period, as denoted by reference numbers 221 to 224 in FIG. 2, each of the terminals 1 to 4 may receive the discovery signals transmitted by the other terminals. By changing the DRB positions on the time-frequency resources every D2D period in this way, an arbitrary terminal may receive the discovery signals that have been transmitted by other terminals during the previous D2D period. According to an embodiment of the present invention, the time-frequency hopping scheme may be determined according to at least one of a method configured to the terminal and a method indicated in a message received from the base station.

The above description has been made of the methods for multiplexing the D2D and cellular signals, multiplexing discovery signal transmission resources into a D2D period, and changing the DRB positions every D2D period according to the present invention. Hereinafter, a description is made of the problem caused by in-band emission power in association with the D2D operation.

In the present invention, a D2D terminal transmits a D2D signal on one DRB. In this case, if the signal transmission is performed with an arbitrary frequency block in the whole frequency band, an arbitrary transmit power with a relative value of the transmit power on the frequency block may occur outside the frequency block. This is called band re-emission power.

In reference to FIG. 2, if terminal 1 transmits its discovery signal at 23 dBm on the DRB 1 211, a power of −7 dBm that differs as much as 30 dB from the transmit power on DRB 1 appears on other DRBs in the same subframe, which may cause additional noise or an interference effect to other terminals transmitting and receiving signals on the corresponding regions. A description is made of the properties of the in-band emission power hereinafter with reference to FIG. 3.

Figure 3:
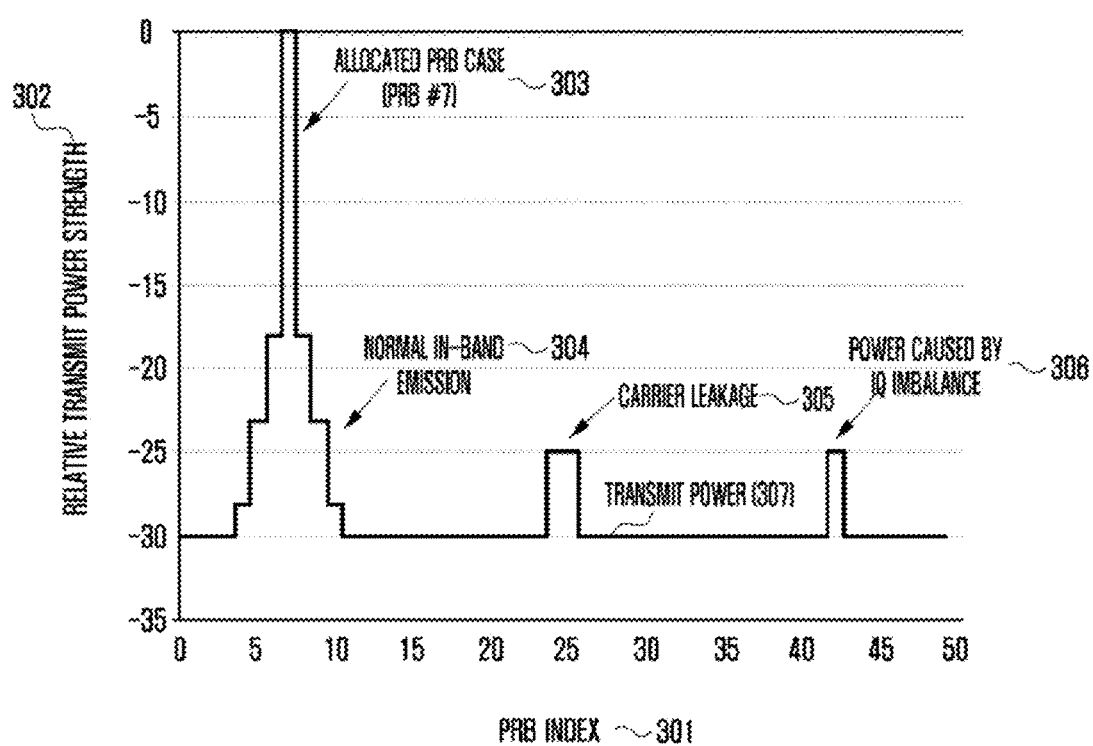
FIG. 3 is a diagram illustrating emission power when a terminal transmits a signal.

FIG. 3 is a diagram illustrating emission power when a terminal transmits a signal.

FIG. 3 depicts how the in-band emission power appears in the whole band. FIG. 3 shows a value as a requirement of the in-band emission power, which should be less than the appeared value in an embodiment of the present invention; and, if being applied in reality, the in-band emission power may have the same value as shown in the drawing. In FIG. 3, the horizontal axis 301 denotes the PRB index, i.e., frequency, and the vertical axis 302 denotes the relative size of transmit power.

If data transmission is performed at an arbitrary transmit power level on a PRB #7 as an allocated frequency as denoted by reference number 303, a transmit power of −30 dB occurs across the whole band as denoted by reference number 307, and transmit powers that are greater than −30 dB are formed on 2 or 3 PRBs around the allocated frequency as denoted by reference number 304 (in detail, the transmit powers on the 2 or 3 PRBs around the allocated frequency may be formed in a stepwise manner.) This is referred to as in-band emission.

As denoted by reference number 305, an extra emission power caused by carrier leakage appears on at least one of the PRBs #24 and #25 located at the center of the whole band; thus, the transmit power increases to become greater than −30 dB. Also, an extra emission power caused by IQ imbalance may appear on the image frequencies of the allocated frequency that are located at positions symmetric around the center frequency; thus the transmit power increases to become greater than −30 dB as denoted by reference number 306. In FIG. 3, since the allocated frequency is PRB #7, the extra emission power caused by IQ imbalance appears on PRB #42.

In order to solve the problem in that the in-band emission power caused by D2D signal transmission acts as noise to cellular signal transmission, use of the following methods may be considered.

Figure 4:
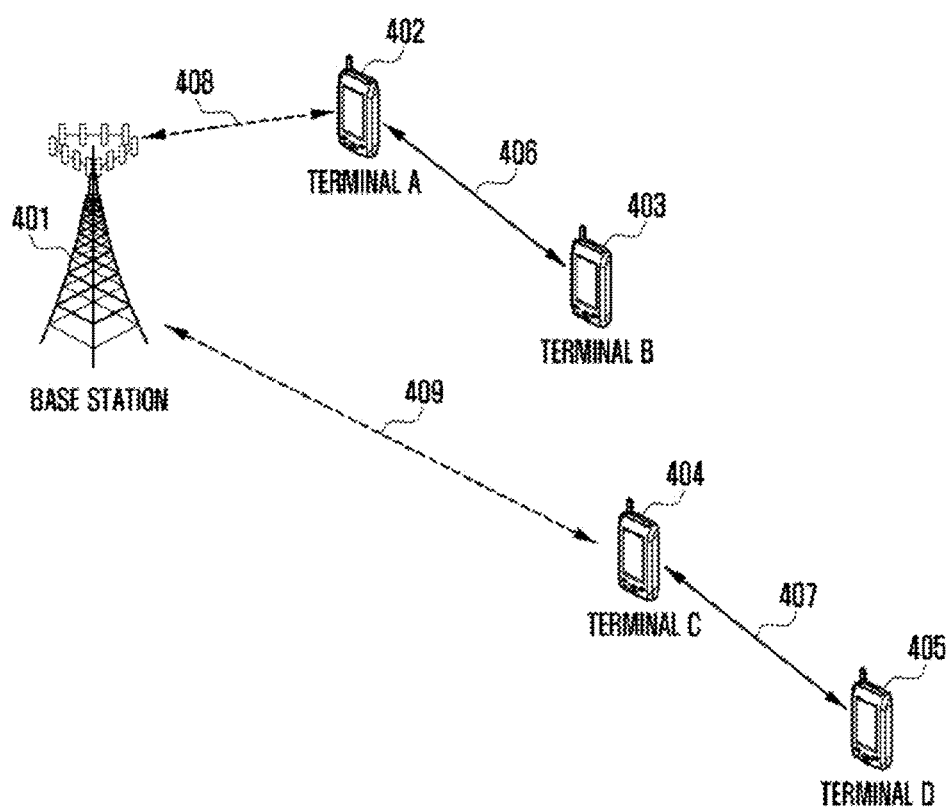
FIG. 4 is a diagram illustrating the first method according to the present invention.

The first method is to determine the D2D signal transmit power in consideration of the distance from a base station. FIG. 4 is a diagram illustrating the first method according to the present invention. It is assumed that D2D terminals A to D 402, 403, 404, and 405 are located within the signal transmission range of a base station 401; the terminal A 402 located closest to the base station sends a D2D signal to the terminal B 403; and the terminal C 404 located farthest from the base station sends the D2D signal to the terminal D 405. Here, the influence of the D2D signals transmitted by the terminal A 402 and the terminal C 404 to the base station may be considered. That is, a signal transmitted by a terminal located close to the base station arrives at the base station at a high-power level; thus, the in-band emission power caused by the signal may contribute to an increase of noise to a cellular signal transmission. In the case of the terminals located far from the base station, however, although they transmit signals at transmit power levels higher than those of the terminals located close to the base station, the contribution of the in-band emission power caused by the signals arriving at the base station to the increase of noise to the cellular signal transmission is negligible. However, if only the distance from the base station is considered to determine the D2D signal transmit power level, this may cause a problem of a service quality change according to the position of the terminal.

The second method is to determine the D2D signal transmit power in such a way of sorting D2D terminals into groups by distance from a base station and allocating D2D resources by group in a time division multiplexing manner.

Figure 5:
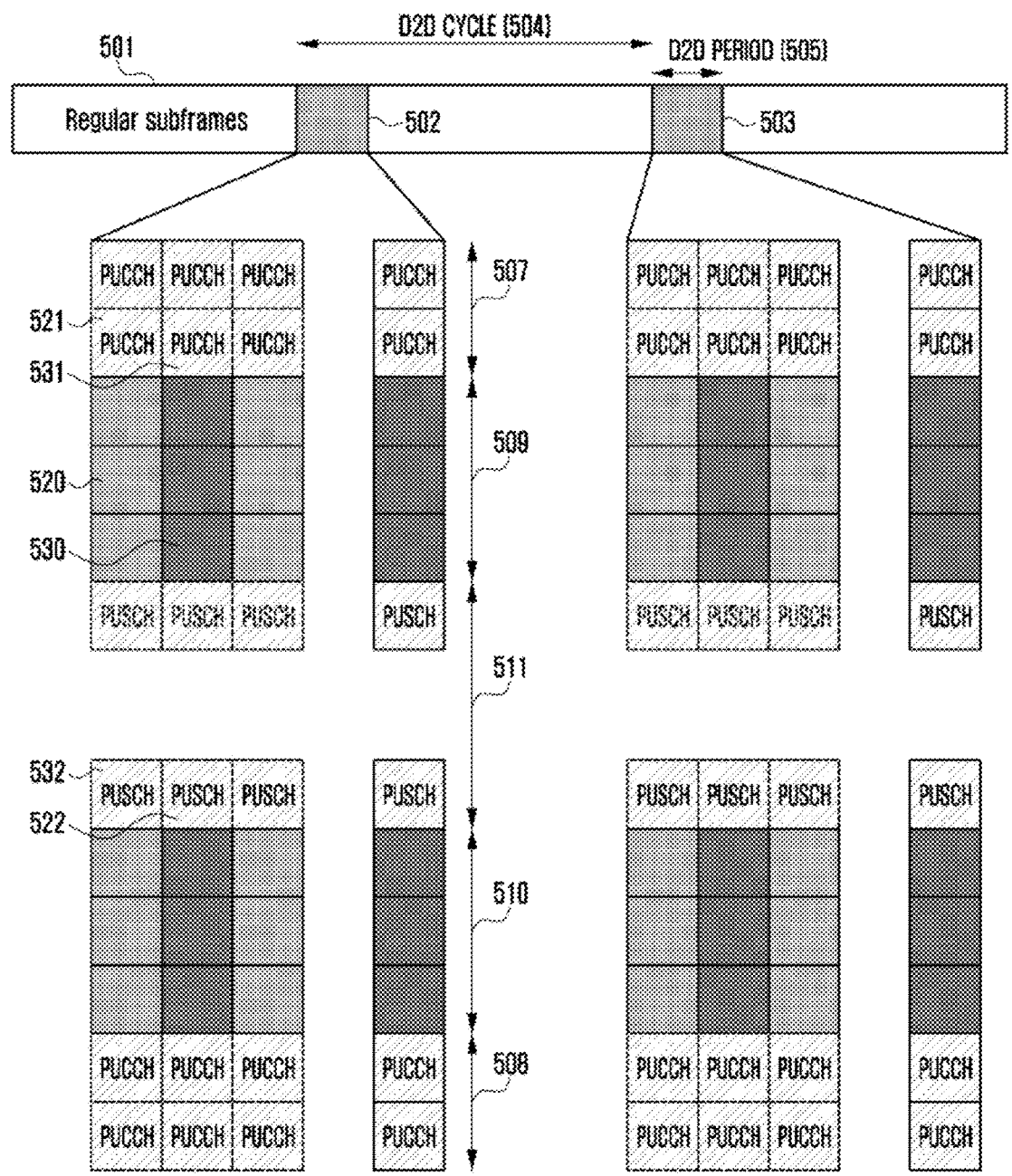
FIG. 5 is a diagram illustrating a method for grouping terminals to allocate resources.

FIG. 5 depicts a method of grouping terminals to allocate resources. Reference number 501 denotes regular subframes, and reference numbers 502 and 503 denote D2D subframes. A D2D signal may be transmitted in preconfigured subframes but may not be transmitted in all subframes. As shown in FIG. 5, it may also be possible to configure even the subframes allocated for D2D signal transmission to convey PUCCH and PUSCH for cellular communication. That is, the D2D signal transmission resources and legacy cellular signal transmission resources are multiplexed into a subframe configured for D2D transmission in the frequency domain. The period 501 may be configured for use in cellular communication, and the periods 502 and 503 may be configured for use in D2D communication. The D2D signals are multiplexed into the at least one of the periods 502 and 503 with the length of the D2D period 505, and the D2D periods may include PUCCHs 507 and 508 carrying an HARQ acknowledgement or CQI as DL channel condition information and PUSCH 511 carrying UL cellular data. According to an embodiment of the present invention, the PUCCHs may be arranged at both edges of the frequency band in the D2D period as denoted by reference numbers 507 and 508, and the PUSCH 511 may be arranged at the center of the frequency band. Along with the PUCCH and PUSCH, the D2D signals may be multiplexed into the D2D period 505 on the D2D resources 509 and 510, i.e., D2D resource blocks (DRBs) are multiplexed into a time-frequency region. According to an embodiment of the present invention, one DRB may be defined as an arbitrary size of a time-frequency resource unit, and it may be possible to multiplex a plurality of DRBs into a D2D period in a shape of a grid. In order to support the D2D discovery operation, the terminal may transmit a discovery signal every D2D at a resource position selected randomly or according to an arbitrary rule. Here, the terminal may belong to a group generated based on the distance from the base station. The distance between the base station and the terminal may be determined using the value of a received signal received power (RSRP) measured by the terminal on the basis of the signal transmitted by the base station, and the terminal determines the group to which it belongs based on the currently measured RSRP. Although FIG. 5 depicts two resource regions 520 and 530 corresponding to each of two terminal groups, i.e., lightly shaded resource region 520 and darkly shaded resource region 530, the number of groups may be greater than 2. Each group may be configured with a maximum value and a minimum value of RSRP for sorting a terminal into the group, e.g., group 520 with an RSRP range of {−infinity, −100 dBm} and group 530 with an RSRP range of {−100 dBm, +infinity}. As the maximum and minimum RSRP values per group are configured based on the information contained in a system information block (SIB) transmitted by the base station, all of the RRC-connected and RRC-idle terminals may be aware of the configuration values. In this case, a terminal of which the RSRP is less than −100 dBm is sorted into the group allocated the resource region 520, and a terminal of which the RSRP is greater than −100 dBm is sorted into the group allocated the resource region 530. A terminal belonging to one group transmits its D2D discovery signal on the resources allocated to the group, i.e., the lightly shaded resource region 520 in FIG. 5, and a terminal belong to the other group transmits its discovery signal on the resources allocated to the other group, i.e., the darkly shaded resource region 530 in FIG. 5. In this embodiment, terminals are grouped based on the RSRP to allocate the resources of the resource region 530 to the terminals close to the base station and the resource of the resource region 520 to the terminals far from the base station. In this case, the in-band emission power caused by D2D signal transmission on the PUCCH resource 521 and PUSCH resource 522 that are frequency-multiplexed with the D2D transmission resource for use by the terminals belonging to the group allocated the resource region 520 is so low as to cause little noise to cellular signal transmission. In contrast, the in-band emission power caused by D2D signal transmission on the PUCCH resource 531 and PUSCH resource 532 that are frequency-multiplexed with the D2D transmission resource for use by the terminals belonging to the group allocated the resource region 530 is so high as to cause significant noise to cellular signal transmission. This D2D discovery terminal grouping method is advantageous in terms of reducing the impact of D2D signal transmission to the cellular signal transmission as much as possible by gathering together D2D transmission resources for use by the terminals causing significant in-band emission power impact to the base station.

The present invention proposes a method for reducing the impact of D2D signal transmission to cellular signal transmission in such a way that the base station performs physical downlink shared channel (PDSCH) and PUSCH scheduling dynamically based on D2D terminal group information. The present invention is described by way of the following embodiments.

Embodiment 1. Method of interpreting ACK/NACK transmitted on PUCCH resource frequency-multiplexed with D2D transmission resources in use by a terminal located close to a base station.

This embodiment is directed to a method for a base station to interpret an ACK/NACK transmitted on the PUCCH resource 531 in FIG. 5 as NACK. The ACK/NACK means positive acknowledgement/negative acknowledgement information corresponding to the data transmitted on PUCCH from a base station to a terminal. As the PUCCH resource 531 of FIG. 5 is cellular communication resource vulnerable to D2D signal transmission impact, it is difficult for the base station to rely on the ACK/NACK being received on such PUCCH resources that have a high probability of error occurrence. If the base station misinterprets an ACK, the ACK being transmitted by the terminal to acknowledge correct receipt of the corresponding data, as a NACK, and thus retransmits the same data again, this results in degradation of resource utilization efficiency. In contrast, if the base station misinterprets a NACK, the NACK being transmitted by the terminal to negatively acknowledge the receipt of the corresponding data, as an ACK and thus assumes that that the terminal has received the corresponding data correctly, this results in data transmission failure.

In the present embodiment, as it is considered that the misinterpretation of NACK as ACK causes more significant problems such as transmission performance degradation in comparison with the misinterpretation of ACK as NACK, the base station assumes that the ACK/NACK received on the PUCCH resource 531 is NACK in decoding, without making any ACK/NACK determination, to avoid the situation where NACK is misinterpreted as ACK. However, it may also be possible for the base station to perform a normal decoding process that is used in the legacy cellular communication and that is less vulnerable to D2D signal transmission impact when the ACK/NACK is received on the PUCCH resource 521.

Embodiment 2. Method of interpreting channel state information (CSI) transmitted on PUCCH resource frequency-multiplexed with D2D transmission resource in use by a terminal located close to a base station.

This embodiment is directed to a method for a base station to ignore CSI that a terminal transmits on the PUCCH resource 531 in FIG. 5 and use the previously received CSI. The terminal transmits the CSI on the PUCCH resource 531 at an arbitrary interval. In FIG. 5, the PUCCH resource 531 is part of cellular communication resources vulnerable to D2D signal transmission impact; thus, the base station cannot rely on information obtained by decoding the CSI transmitted on the resource 531 because the CSI is likely to have been received with a large amount of noise. Accordingly, although the CSI received on the PUCCH resource 531 is correctly decoded, the base station does not use the corresponding CSI and performs scheduling based on the previously received CSI instead of the unreliable current CSI.

Assuming that the base station that receives the CSI transmitted on the resource 531 has a previously received and stored CSI value because the terminal transmits CSI periodically and in response to a request from the base station, the base station may use the previously received CSI. However, it may also be possible for the base station to perform scheduling based on the value obtained by decoding the CSI received on the PUCCH resource 521 that is not very vulnerable to D2D signal transmission impact, the CSI being decoded with the normal CSI decoding scheme in use for the legacy cellular communication.

Embodiment 3. Method of avoiding ACK/NACK transmission on PUSCH resource frequency-multiplexed with D2D transmission resource in use by a terminal located close to a base station.

Figure 6:
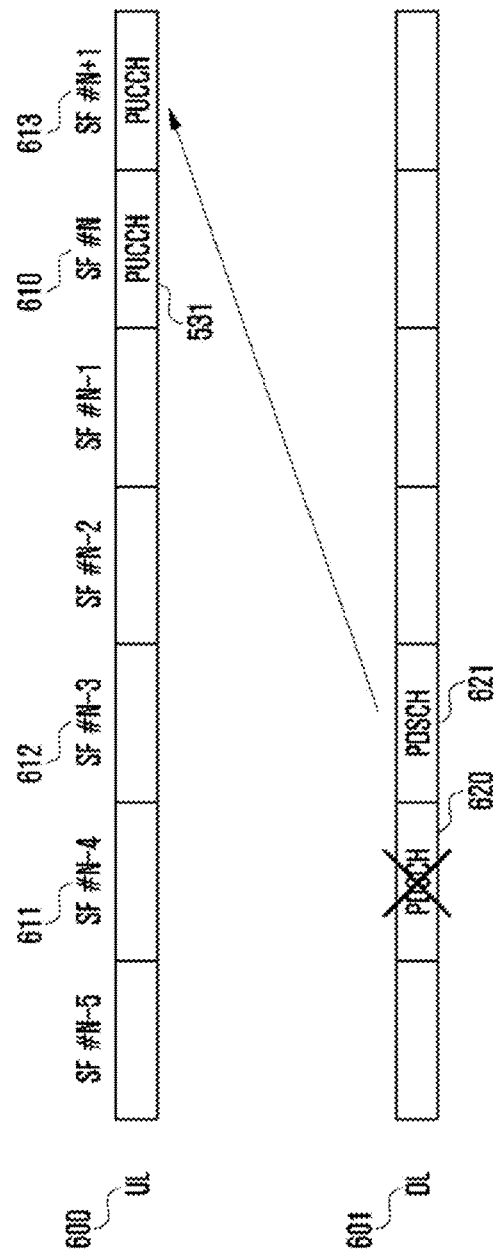
FIG. 6 is a diagram illustrating a method for preventing a terminal located close to the base station from transmitting ACK/NACK on a PUCCH resource frequency-multiplexed with a D2D transmission resource.

This embodiment is directed to a method for a base station to perform scheduling to avoid a situation where an ACK/NACK is transmitted on the PUCCH resource 531 in FIG. 5. FIG. 6 is a diagram illustrating a method for preventing a terminal located close to the base station from transmitting ACK/NACK on the PUCCH resource frequency-multiplexed with the D2D transmission resource. In the case where the PUCCH resource included in subframe N 610 is frequency-multiplexed with the resource allocated to a group of terminals located close to the base station like the PUCCH resource 531 in FIG. 5, the base station avoids scheduling downlink data transmission on the PDSCH resource 620 in subframe N−4 611, which is 4 subframes ahead of the subframe including the PUCCH resource, and schedules data transmission on a certain PDSCH resource such that the corresponding ACK/NACK is transmitted in a subframe including the PUCCH resource that is not frequency-multiplexed with D2D transmission resources. That is, if subframe N+1 613 includes no D2D transmission resource or includes a PUCCH resource such as the PUCCH resource 521 of FIG. 5 (resource less vulnerable to the D2D transmission impact), the base station changes the data transmission timing from the PDSCH resource 620 scheduled in subframe N−4 611 to the PDSCH resource 621 scheduled in subframe N−3 612. At this time, the ACK/NACK corresponding to the PDSCH 621 is transmitted in subframe N+1 613.

In this case, although skipping PDSCH transmission scheduled in subframe N−4 611 causes resource waste, this resource waste is negligible because the base station does not always use all available resources. Preferably, this method is advantageous in a situation where the resources available for use by the base station are sufficient rather than insufficient.

Embodiment 4. Method of interpreting ACK/NACK transmitted on PUCCH resource frequency-multiplexed with D2D transmission resource in use by a terminal located close to a base station through appropriate PDSCH scheduling.

Figure 7:
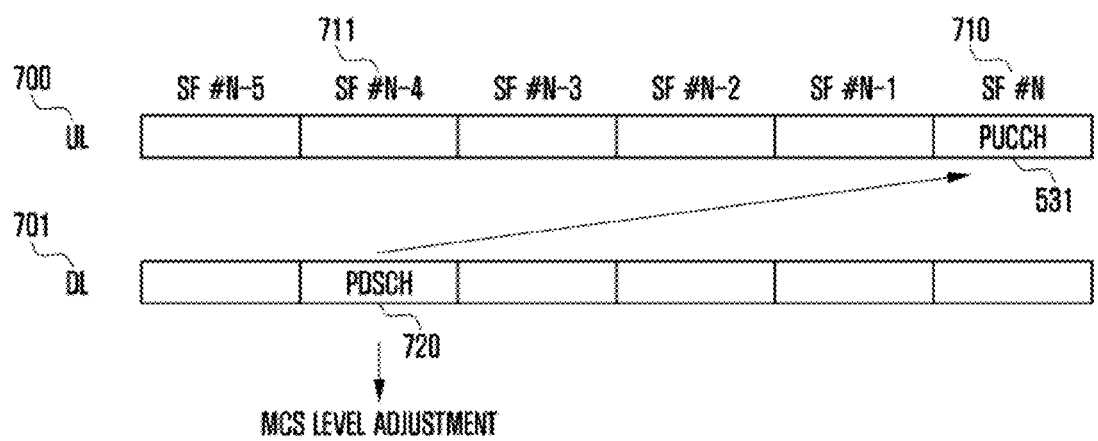
FIG. 7 is a diagram illustrating a method for interpreting ACK/NACK transmitted on a PUCCH resource frequency-multiplexed with a D2D transmission resource in use by a terminal located close to the base station through appropriate PDSCH scheduling.

This embodiment is directed to a method for a base station to assume that the ACK/NACK transmitted by a terminal on PUCCH resources such as PUCCH resource 531 of FIG. 5 is ACK. FIG. 7 depicts a method for interpreting ACK/NACK transmitted on PUCCH resource frequency-multiplexed with D2D transmission resources in use by a terminal located close to the base station through appropriate PDSCH scheduling. As the PUCCH resource 531 of FIG. 5 is part of cellular communication resources vulnerable to D2D signal transmission impact, it is difficult for the base station to rely on the ACK/NACK being received on such PUCCH resources that have a high probability of error occurrence. In this respect, assuming that the PUCCH resource of subframe N 710 is the PUCCH resource 531 of FIG. 5, adjustment of a coding rate and modulation and coding scheme (MCS) level by the base station may be considered to minimize a data reception error rate by means of downlink control information (DCI) carried by a physical downlink control channel (PDCCH) for scheduling data on the PDSCH resource 720 in subframe N−4 711, which is followed by the corresponding ACK/NACK transmission in subframe N 710. Assuming that typically the MCS level of PDSCH is controlled to maintain the data error rate at 10%, adjustment of the MCS level of PDSCH in subframe N−4 711 can be considered to maintain the data error rate equal to or less than 1% or 0.1%; and, in this case, the base station assumes that the data transmission on the PDSCH resource in subframe N−4 711 is successful (ACK'ed) regardless of receipt of ACK/NACK in subframe N 710. If the MCS level of PDSCH is controlled in this way, the terminal may not transmit ACK/NACK corresponding to the data received on the PDSCH resource.

Embodiment 5. Method of skipping ACK/NACK on PUCCH resource frequency-multiplexed with D2D transmission resource in use by a terminal located close to a base station through appropriate PDSCH scheduling.

This embodiment is directed to a method for a base station to perform PDSCH scheduling to prevent a terminal from transmitting ACK/NACK on the PUCCH resources such as PUCCH resource 531 of FIG. 5. As the PUCCH resource 531 of FIG. 5 is cellular communication resource vulnerable to D2D signal transmission impact, it is difficult for the base station to rely on the ACK/NACK being received on such PUCCH resources that have a high probability of error occurrence. In this respect, assuming that the PUCCH resource of subframe N 710 is the PUCCH resource 531 of FIG. 5, transmission of information by the base station on the PDSCH resource of subframe N−4, which does not require ACK/NACK transmission of the terminal, may be considered. For example, it may be possible to transmit system information on the PDSCH resource in subframe N−4 to protect against transmission of ACK/NACK in subframe N, the ACK/NACK corresponding to data transmitted on the PDSCH resource. This method makes it possible to solve the PUCCH performance degradation problem caused by D2D signal transmission impact by avoiding use of the PUCCH resources vulnerable to D2D signal transmission impact such as PUCCH resource 531 of FIG. 5.

Embodiment 6. Method of avoiding scheduling PUSCH resource frequency-multiplexed with D2D signal transmission resource in use by a terminal located close to a base station.

This embodiment is directed to a method for the base station to avoid scheduling on the PUSCH resources vulnerable to D2D signal transmission impact such as PUSCH 532 of FIG. 5 in order to protect against performance degradation in receiving data transmitted on the PUSCH resources. The base station avoids allocating PUSCH resources vulnerable to D2D signal transmission impact such as PUSCH resource 532 of FIG. 5 because the base station is capable of being aware of the performance degradation probability on such PUSCH resources. That is, in the case where it is required to allocate PUSCH resources to an arbitrary terminal, if the base station detects D2D signal transmission scheduled for a terminal located close to the base station in the earliest-arriving subframe, i.e., if the PUSCH resource available in the corresponding subframe is the PUSCH resource such as PUSCH resource 532 of FIG. 5, the base station allocates the PUSCH resource to the corresponding terminal in the next subframe. In this case, the subframe in which the PUSCH resource is allocated to the terminal should not include a D2D signal transmission resource or may include a D2D signal transmission resource allocated to the group of terminals located far from the base station.

Embodiment 7. Method of scheduling PUSCH resource frequency-multiplexed with D2D signal transmission resource in use by a terminal located close to a base station.

This embodiment is directed to a method for adjusting the MCS level for data transmission on the PUSCH resources such as PUSCH resource 532 of FIG. 5. As the PUSCH resource 532 of FIG. 5 is cellular communication resource vulnerable to D2D signal transmission impact, the base station is likely to receive the data transmitted by a terminal on such PUSCH resources with a high probability of error. Assuming that the PUSCH resource 532 of FIG. 5 is included in subframe N, adjustment of the MCS level by the base station, when scheduling data on the PUSCH resource, may be considered to minimize the data reception error rate on the PUSCH resource by means of the DCI transmitted on the PDCCH resource in subframe N−4. Assuming that typically the MCS level of PUSCH is controlled to maintain the data error rate at 10%, adjustment of the MCS level of PUSCH may be considered to maintain the data error rate to be less than 10% to protect against PUSCH data reception performance degradation caused by a D2D signal transmission impact at the base station.

Embodiment 8. Method of allocating PUSCH resource frequency-multiplexed with D2D signal transmission resource in use by a terminal located close to a base station.

This embodiment is directed to a method for a terminal to use the PUSCH resources such as PUSCH resource 532 of FIG. 5 to transmit data to the base station. As the PUSCH resource 532 of FIG. 5 is cellular communication resource vulnerable to D2D signal transmission impact, the base station is likely to receive data transmitted by the terminal on such PUSCH resources with a high probability of error. In particular, if the PUSCH resource is close to the D2D signal transmission resource, the noise caused by D2D in-band emission power increases, resulting in further degradation of data transmission performance on the PUSCH resource. Accordingly, the base station allocates PUSCH resources as far distant as possible from the D2D signal transmission resource 530.

Embodiment 9. Method for controlling transmit power on PUSCH resource frequency-multiplexed with D2D signal transmission resource in use by a terminal located close to a base station.

This embodiment is directed to a method for adjusting data transmission power on the PUSCH resources such as PUSCH resource 532. As the PUSCH resource 532 of FIG. 5 is cellular communication resource vulnerable to D2D signal transmission impact, the base station is likely to receive data transmitted by the terminal on such PUSCH resources with a high probability of error. Assuming that the PUSCH resource 532 of FIG. 5 is included in subframe N, adjustment of the transmit power on the PUSCH by the base station, when scheduling data on the PUSCH, may be considered to minimize the data reception error on the PUSCH resource by means of the DCI transmitted on the PDCCH resource in subframe N−4. That is, the base station may allocate the PUSCH resource along with a transmit power configuration for the terminal to transmit data at a transmit power level as high as possible through a power control to protect against PUSCH data reception performance degradation caused by a D2D signal transmission impact at the base station.

Figure 8:
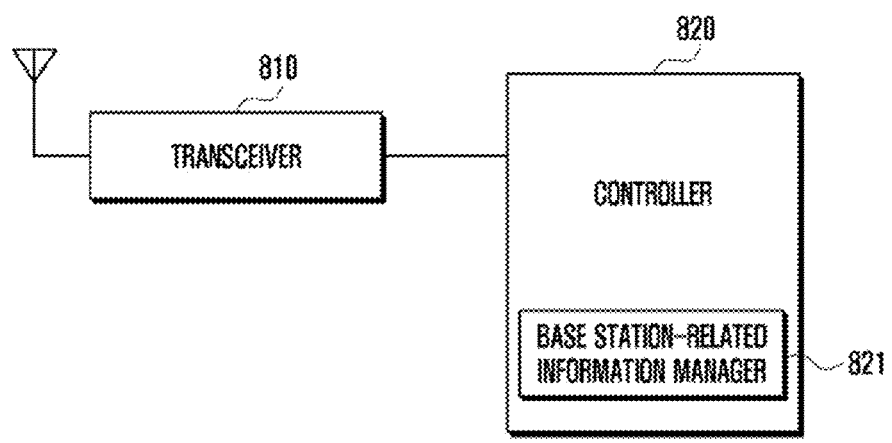
FIG. 8 is a block diagram illustrating a configuration of a base station according to an embodiment of the present invention.

FIG. 8 is a block diagram illustrating a configuration of a base station according to an embodiment of the present invention. As shown in FIG. 8, the base station of the present invention may include a transceiver 810 and a controller 820.

The transceiver 810 may transmit and receive signals to and from arbitrary nodes through wired or wireless interfaces in a wireless communication system. For example, the transceiver 810 may transmit and receive control information or data to and from a terminal through a wireless interface.

The controller 820 controls signal flows among function blocks for the operation of the base station. For example, the controller 820 may control the control information or data transmission over PUCCH and PUSCH resources frequency-multiplexed with D2D signal transmission resources according to the method proposed in the above embodiments. The controller may include a base station-related information manager 821 and, in this case, the base station-related information manager 821 may control the control information or data transmission.

According to an embodiment of the present invention, the controller 820 may interpret PUCCH in different ways.

As described above, the present invention is advantageous in terms of minimizing interference of D2D communication to cellular communication by differentiate resources and maintaining cellular communication throughput through enhanced scheduling and power control of the base station on the resources vulnerable to interference.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method by a base station for a wireless communication system, the method comprising:
   transmitting, to a terminal, downlink data;
   receiving, from the terminal, hybrid automatic repeat request (HARQ) information corresponding to the downlink data via a first resource on a physical uplink control channel (PUCCH);
   determining whether the first resource for the HARQ information is included in a second resource; and
   determining that the HARQ information includes negative acknowledgement (NACK) information, in case that the first resource is included in the second resource,
   wherein the second resource is multiplexed with a device-to-device (D2D) communication resource used by at least one terminal with a reference signal received power (RSRP) value, measured for a reference signal of the base station, greater than a predetermined threshold value.

2. The method of claim 1, wherein, in case that the first resource is not included in the second resource, the HARQ information including acknowledgement (ACK) or the NACK information is decoded by the base station.

3. The method of claim 2, wherein the determining that the HARQ information includes the NACK information further comprises:
   determining that the HARQ information includes the NACK information regardless of whether the HARQ information includes the ACK or the NACK information, in case that the first resource is included in the second resource.

4. A method by a base station for a wireless communication system, the method comprising:
identifying, in case that downlink data for a terminal is to be transmitted in a first subframe, a first resource used for a transmission of acknowledgement (ACK) or negative acknowledgement (NACK) information corresponding to the downlink data which is received on a physical uplink control channel (PUCCH);
identifying whether the first resource is to be included in a second resource; and
transmitting, to the terminal, the downlink data in a second subframe following the first subframe, in case that the first resource is to be included in the second resource,
wherein the second resource is multiplexed with a device-to-device (D2D) communication resource used by at least one terminal with a reference signal received power (RSRP) value, measured for a reference signal of the base station, greater than a predetermined threshold value.

5. The method of claim 4, further comprising:
transmitting, to the terminal, the downlink data in the first subframe, in case that the first resource is not to be included in the second resource.

6. A method by a base station for a wireless communication system, the method comprising:
identifying a first resource used for a transmission of uplink data transmitted from a terminal on a physical uplink shared channel (PUSCH), based on first downlink control information;
identifying whether the first resource is to be included in a second resource;
adjusting, in case that the first resource is to be included in the second resource, modulation and coding scheme (MCS) level information included in the first downlink control information; and
transmitting, to the terminal, second downlink control information including the adjusted MCS level information,
wherein the second resource is multiplexed with a device-to-device (D2D) communication resource used by at least one terminal with a reference signal received power (RSRP) value, measured for a reference signal of the base station, greater than a predetermined threshold value.

7. The method of claim 6, further comprising:
transmitting, to the terminal, the second downlink control information including the MCS level information, in case that the first resource is not to be included in the second resource.

8. A base station for a wireless communication system, the base station comprising:
a transceiver; and
a controller configured to:
transmit, to a terminal via the transceiver, downlink data;
receive, from the terminal via the transceiver, hybrid automatic repeat request (HARQ) information corresponding to the downlink data via a first resource on a physical uplink control channel (PUCCH);
determine whether the first resource is included in a second resource; and
determine that the HARQ information includes negative acknowledgement (NACK) information, in case that the first resource included in the second resource,
wherein the second resource is multiplexed with a device-to-device (D2D) communication resource used by at least one terminal with a reference signal received power (RSRP) value, measured for a reference signal of the base station, greater than a predetermined threshold value.

9. The base station of claim 8, wherein the controller is further configured to perform, in case that the first resource is not included in the second resource, decoding on the HARQ information including acknowledgement (ACK) or the NACK information.

10. The base station of claim 9, wherein the controller is further configured to determine that the HARQ information includes the NACK information regardless of whether the HARQ information includes the ACK or the NACK information, in case that the first resource is included in the second resource.

11. A base station for a wireless communication system, the base station comprising:
a transceiver; and
a controller configured to:
identify, in case that downlink data for a terminal is to be transmitted in a first subframe, a first resource used for a transmission of acknowledgement (ACK) or negative acknowledgement (NACK) information corresponding to the downlink data which is received on a physical uplink control channel (PUCCH);
identify whether the first resource is to be included in a second resource; and
transmit, to the terminal via the transceiver, the downlink data in a second subframe following the first subframe, in case that the first resource is to be included in the second resource,
wherein the second resource is multiplexed with a device-to-device (D2D) communication resource used by at least one terminal with a reference signal received power (RSRP) value, measured for a reference signal of the base station, greater than a predetermined threshold value.

12. The base station of claim 11, wherein the controller is further configured to transmit, to the terminal, the downlink data in the first subframe, in case that the first resource is not to be included in the second resource.

13. A base station for a wireless communication system, the base station comprising:
a transceiver; and
a controller configured to:
identify, a first resource used for a transmission of uplink data transmitted from a terminal on a physical uplink shared channel (PUSCH), based on first downlink control information;
identify whether the first resource is to be included in a second resource;
adjust, in case that the first resource is to be included in the second resource, modulation and coding scheme (MCS) level information included in the first downlink control information; and
transmit, to the terminal via the transceiver, second downlink control information including the adjusted MCS level information,
wherein the second resource is multiplexed with a device-to-device (D2D) communication resource used by at least one terminal with a reference signal received power (RSRP) value, measured for a reference signal of the base station, greater than a predetermined threshold value.

14. The base station of claim 13, wherein the controller is further configured to transmit, to the terminal via the transceiver, the second downlink control information including the MCS level information, in case that the first resource corresponding to the PUSCH is not to be included in the second resource.

* * * * *